(12) United States Patent
Sawdon et al.

(10) Patent No.: US 6,770,603 B1
(45) Date of Patent: Aug. 3, 2004

(54) ELECTRICALLY CONDUCTIVE NON-AQUEOUS WELLBORE FLUIDS

(75) Inventors: Christopher Sawdon, Par (GB); Mostafa Tehrani, St. Austell (GB); Paul Craddock, St. Austell (GB); Anthony Lawson, St. Austell (GB)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 09/889,364

(22) PCT Filed: Jan. 13, 2000

(86) PCT No.: PCT/EP00/00357
§ 371 (c)(1),
(2), (4) Date: Feb. 5, 2002

(87) PCT Pub. No.: WO00/41480
PCT Pub. Date: Jul. 20, 2000

(30) Foreign Application Priority Data

Jan. 16, 1999 (GB) .............................. 9900904

(51) Int. Cl.⁷ ................................. C09K 7/06
(52) U.S. Cl. ................ 507/140; 507/128; 507/131; 507/134; 507/136; 507/235; 507/236; 507/237; 507/238; 507/244; 507/259; 507/261; 507/265; 507/269; 507/138; 507/925; 166/254.2
(58) Field of Search .................. 507/140, 128, 507/134, 131, 136, 138, 235–238, 244, 261, 265, 269, 259, 925; 166/254.2

(56) References Cited

U.S. PATENT DOCUMENTS

| | | |
|---|---|---|
| 2,542,020 A | 2/1951 | Fischer |
| 2,552,775 A | 5/1951 | Fischer et al. |
| 2,573,961 A | 11/1951 | Fischer |
| 2,696,468 A | 12/1954 | Fischer |
| 2,739,120 A | 3/1956 | Fischer |
| 3,671,427 A * | 6/1972 | Andrews et al. ............. 507/107 |
| 4,012,329 A | 3/1977 | Hayes et al. |
| 4,659,486 A * | 4/1987 | Harmon ...................... 507/107 |
| 4,689,161 A | 8/1987 | Blumenthal et al. |
| 4,735,733 A * | 4/1988 | Blumenthal et al. ......... 507/103 |

FOREIGN PATENT DOCUMENTS

| | | | |
|---|---|---|---|
| EP | 0449257 A2 | 10/1991 | ............ C09K/7/06 |
| EP | 0902076 A2 | 3/1999 | ............ C09K/7/06 |

OTHER PUBLICATIONS

"Carbon Black" *Encyclopedia of Polymer Science and Engineering*, vol. 2, 1985, Mark, H. F. Editor, John Wiley & Sons, New York, pp. 623–637.

"Carbon Black: A Low Cost Colloidal Additive for Controlling Gas–Migration in Cement Slurries," Calloni g. et al., SPE International Symposium on Oilfield Chemistry, SPE 28959, Feb. 1995.

\* cited by examiner

*Primary Examiner*—Philip C. Tucker
(74) *Attorney, Agent, or Firm*—Howrey Simon Arnold & White L.L.P.; Carter White

(57) ABSTRACT

A wellbore fluid having a non-aqueous continuous liquid phase that exhibits an electrical conductivity increased by a factor in order of $10^4$ to $10^7$ compared to conventional invert emulsion comprises from about 0.2% to about 10% by volume of carbon black particles and one or more emulsifying surfactant(s) selected from the class including non-ionic emulsifiers of Hydrophilic-Lipophilic Balance (HLB) less than about 12, and anionic surfactants wherein the counter-ion (cation) is any of alkali metal, ammonium, or hydrogen ions. This wellbore fluid can be used for drilling or completing a well and can be used for providing enhanced information from electrical logging tools, measurement while drilling, logging while drilling, geosteering and the like.

12 Claims, No Drawings

ELECTRICALLY CONDUCTIVE NON-AQUEOUS WELLBORE FLUIDS

This invention relates to non-aqueous wellbore fluids and in particular concerns wellbore fluids which are electrically conductive. The invention also relates to the use of said wellbore fluids for drilling or completing subterranean wells such as oil and gas wells. In the process of rotary drilling a well, a drilling fluid or mud is circulated down the rotating drill pipe, through the bit, and up the annular space between the pipe and the formation or steel casing, to the surface. The drilling fluid performs different functions. It removes cuttings from the bottom of the hole to the surface, suspends cuttings and weighting material when the circulation is interrupted, controls subsurface pressure, isolates the fluids from the formation by providing sufficient hydrostatic pressure to prevent the ingress of formation fluids into the wellbore, cools and lubricates the drill string and bit, maximises penetration rate etc. An important objective in drilling a well is also to secure the maximum amount of information about the type of formations being penetrated and the type of fluids or gases in the formation. This information is obtained by analysing the cuttings and by electrical logging technology and by the use of various downhole logging techniques, including electrical measurements.

The required functions can be achieved by a wide range of fluids composed of various combinations of solids, liquids and gases and classified according to the constitution of the continuous phase mainly in two groupings: aqueous (water-based) drilling fluids, and non-aqueous (mineral oil or synthetic-base) drilling fluids, commonly called 'oil-based fluids'.

Water-based fluids constitute the most commonly used drilling fluid type. The aqueous phase is made of fresh water or, more often, of a brine. As discontinuous phases, they may contain gases, water-immiscible fluids such as diesel oil to form an oil-in-water emulsion, and solids including clays and weighting material such as barite. The properties are typically controlled by the addition of clay minerals, polymers and surfactants.

In drilling water-sensitive zones such as reactive shales, production formations or where bottom hole temperature conditions are severe or where corrosion is a major problem, oil-based drilling fluids are preferred. The continuous phase is a mineral or synthetic oil and commonly contains water or brine as discontinuous phase to form a water-in-oil emulsion or invert emulsion. The solid phase is essentially similar to that of water-based fluids and these fluids too contain several additives for the control of density, rheology and fluid loss. The invert emulsion is formed and stabilised with the aid of one or more specially selected emulsifiers.

Although oil-based drilling fluids are more expensive than water-based muds, it is on the basis of the added operational advantage and superior technical performance of the oil-based fluids that these are often used for the drilling operations.

An area where oil-based muds have been at a technical disadvantage, because of their very low electrical conductivity, is in electrical well-logging. Various logging and imaging operations are performed during the drilling operation, for example while drilling in the reservoir region of an oil/gas well in order to determine the type of formation and the material therein. Such information may be used to optimally locate the pay zone, i.e. where the reservoir is perforated in order to allow the inflow of hydrocarbons to the wellbore.

Some logging tools work on the basis of a resistivity contrast between the fluid in the wellbore (drilling fluid) and that already in the formation. These are known as resistivity logging tools. Briefly, alternating current flows through the formation between two electrodes. Thus, the fluids in the path of the electric current are the formation fluids and the fluid which has penetrated the formation by way of filtration. The filtercake and filtrate result from filtration of the mud over a permeable medium (such as formation rock) under differential pressure.

Another example where fluid conductivity plays an important part in the drilling operation is in directional drilling where signals produced at the drill assembly have to be transmitted through an electrically conductive medium to the control unit and/or mud telemetry unit further back on the drill string.

At present the use of resistivity logging tools is limited mainly to cases where a water-based drilling fluid is used for the drilling operation (the very low conductivity of the base-oil in the case of oil/synthetic-base muds precludes the use of resistivity tools in such fluids). Although the brine dispersed in the oil phase is electrically conductive, the discontinuous nature of the droplets prevents the flow of electricity. Indeed, the inability of these emulsions to conduct electricity (until a very high potential difference is applied) is used as a standard test of emulsion stability. To that extent it is worth bearing in mind that the electrical conductivity of the oil base is typically in the range $10^{-6}$ to $5 \times 10^2$ $\mu$S.m$^{-1}$ at a frequency of 1 kHz while an electrical conductivity of not less than 10 $\mu$S.m$^{-1}$ and preferably of no less than $10^3$ $\mu$S.m$^{-1}$ is desirable for electrical logging operations. So there is a need to increase the electrical conductivity of the fluid by a factor in the order of $10^4$ to $10^7$.

A few attempts to make oil-based drilling fluids electrically conductive for the purpose of electrical logging have been reported though none of them has been a commercial success. U.S. Pat. Nos. 2,542,020, 2,552,775, 2,573,961, 2,696,468 and 2,739,120, all to Fischer, disclose soap-stabilised oil-based fluids comprising an alkaline-earth metal base dissolved in up to 10% by weight water. Fischer claims to reduce the electrical resistivity to below 500 ohm-m which corresponds to an increase of conductivity to $\kappa > 2000$ $\mu$S m$^{-1}$. However, those fluids happen to be very sensitive to contaminants and greater amounts of water lead to unacceptable increase of the fluid loss. In essence these fluids relied on the residual or added water content to dissolve the salts/surfactants. Moreover, the continuous oil phase fails to exhibit any increase of its electrical conductivity and there is no reference to what happens to the filtrate which under optimum conditions is made up essentially of the continuous oil phase.

Twenty five years later, U.S. Pat. No. 4,012,329 disclosed an oil-external micro-emulsion made with sodium petroleum sulfonate and reported of resistivity <1ohm-m ($\kappa > 1$ S m$^{-1}$). In such a micro-emulsion, the sodium petroleum sulfonate forms micelles that contain water and the clay so that the clay has to be added as a dispersion in water and cannot be added as dry powder. It should be also emphasised that a micro-emulsion is distinctly different from a standard emulsion, being thermodynamically stable, smaller in size, higher in surface to volume ratio and forming both filtercakes and fluid filtrate of a different nature. Obtaining the necessary combination of bulk properties and non-damaging rock interactions is more difficult than for a standard direct or invert emulsion fluid, and such fluids are not generally favoured for drilling oil wells.

Although the prior art contains formulations for making oil-based drilling fluid conductive, the methods so described adversely affect other mud properties, another reason why none have been successfully commercialised.

The aim of this invention is thus to provide a non-aqueous wellbore fluid which exhibits a substantial electrical conductivity.

When mixed in an article at sufficient concentrations, carbon black is known to impart electrical conductivity to otherwise insulating materials such as plastics or elastomers. The extremely small carbon black particles (<<1 micron) are known to form an interconnecting network which allows the conduction of electricity. Such articles can thus, for instance, avoid the build up of static electricity or shield against electromagnetic interference.

However, when carbon black was added to a conventional invert emulsion oil-based drilling fluid or mud (hereinafter referred to as OBM), little or no useful increase in conductivity was observed.

More specifically it has been found that the calcium soaps of fatty acids such as tall oil fatty acid will interact with the network of carbon particles, decreasing the particle-particle attractive forces by adsorbing onto the particles. Similarly, invert emulsifiers or wetting agents having primary, secondary, tertiary amine groups or quaternary ammonium groups have been found to adsorb similarly and disrupt the conductive network of carbon black particles. Examples of such amine-containing products include fatty alkyl amidoamines, fatty alkyl imidazolines, fatty alkylamidoamines further reacted or cross-linked with di- or tri-basic acids such as maleic acid. Such calcium fatty acid soaps and amine-functional products are in very common use in all invert emulsion drilling fluids known to the applicants.

This invention has discovered that when carbon black is mixed in an OBM containing certain types of emulsifiers and oil-wetting agents, high levels of electrical conductivity can be obtained at advantageously low concentrations of carbon black.

Surprisingly, it has been found that in spite of the very high surface area and adsorption capacity of carbon black, certain invert emulsifiers and oil-wetting agent types do not disrupt the electrically conductive carbon black network.

In accordance with the invention, an electrically conductive invert emulsion wellbore fluid comprises from about 0.2% to about 10% by volume of carbon black particles and one or more emulsifying surfactant(s) selected from the class including: nonionic emulsifiers of Hydrophilic-Lipophilic Balance (HLB) less than about 12, and anionic surfactants wherein the counter-ion (cation) is any of alkali metal, ammonium, or hydrogen ions.

All non-ionic surfactants found to date of an Hydrophilic-Lipophilic Balance (HLB) suitable to promote invert emulsification, do not destroy the conductivity. These include the diethanolamides based on higher fatty acids of more than 12 carbon atoms such as oleic acid or tall oil fatty acid (TOFA), alkoxylated higher fatty alcohols, alkoxylated alkylphenols, and ethylene oxide/propylene oxide block polymers. Generally, the more suitable HLB values are less than 10, but occasionally in combination with other emulsifiers, higher HLB values up to a maximum of 12 can be useful.

The other suitable classes of surfactants are anionic surfactants of sufficiently lipophilic character where the anionic surfactant is in the form of an alkali metal soap, the ammonium soap, or as the free acid. Polyvalent metal ion (e.g. calcium) soaps of these anionic surfactants are excluded because they have been found to disrupt the conductive network of carbon black particles, presumably by adsorption through ion-bridging by the polyvalent cation.

The most preferred anionic surfactants are sulphonates such as alkane suiphonates, alpha-olefin sulphonates, alkylarene sulphonates, polyolefin sulphonates, and acyl taurates, all characterised by the carbon number of the hydrophobic moiety being at least about 12.

Other suitable anionic emulsifiers or wetting agents include the alkali metal or ammonium salts, or the free acid of fatty acids of 12 or more carbon atoms, phosphate esters of ethoxylated alcohols of 12 or more carbon atoms, phosphate esters of ethoxylated alkylphenols of 14 or more carbon atoms, and alkylarninomethylene phosphonic acids wherein the alkylamine precursor contains 12 or more carbon atoms.

The total dose of emulsifiers is preferably in the range of 0.5% to 10%, based on the total weight of the wellbore fluid.

A preferred carbon black in this invention has a significantly higher specific surface area (i.e. at least 500 $m^2/g$) than the conventional carbon black. A very suitable grade has a specific surface area of about 1500 $m^2/g$ compared to 100–300 $m^2/g$ of the conventional black. This gives the carbon black particles a higher ability to form an interconnecting network of particles which leads to a thixotropic rheological effect and a significant increase in conduction of electricity.

The most important attribute of this invention is that the electrical conductivity of the fluid is increased by a factor of the order of $10^4$ to $10^7$. This allows the successful application of many electrical logging techniques and the transmission of electrical telemetry signals when organic liquid-based wellbore fluids fill the borehole. Another object of the present invention is therefore a method of providing enhanced information from electrical logging tools, measurement-while-drilling (MWD), logging-while-drilling (LWD), geosteering and the like wherein the efficiency is enhanced by the improved electrical conductivity wellbore fluids of the invention.

In this invention it has been found that electrically conductive, oil-based drilling fluids can be provided which maintain the performance advantages expected from known oil-based (or synthetic organic liquid-based) drilling fluids. Therefore, the fluids of this invention minimise adverse interactions with drilled rock formation, such as clay formation swelling or dispersion, hole collapse, or the undesirable dissolution of underground salt formations. They also provide the performance advantages expected from oil-based fluids with regard to enhanced lubricity, reduced differential sticking of drill pipe, and good stability at high temperatures.

According to a preferred embodiment of the present invention, the wellbore fluid also comprises material capable of precipitating or complexing polyvalent metal cations such as the ions of calcium, magnesium and iron which may contaminate the wellbore fluid. This is to prevent the metal cation from forming a soap with emulsifiers which then adsorbs on the surface of carbon black particles and interferes with the conductive network.

Examples of precipitating materials are dissolved anions such as phosphate, carbonate or silicate. Examples of suitable complexing agents are the alkali metal or ammonium salts, or the free acids, of citric acid, gluconic acid. glucoheptanoic acid, ascorbic acid, erythorbic acid, nitrolotriacetic acid, ethylene diamine tetraacetic acid, diethylenetriarnine pentaacetic acid, hydroxyethylidene diphosphonic acid, nitrolotrismethylenephosphonic acid, aminomethylene phosphonates based on ethylene diamine or diethylene triamine or higher ethyleneamines, and polyphosphates such as tetrasodium pyrophosphate The continous non aqueous phase may be selected from any refined or synthetic fluid known to be suitable as a wellbore fluid base liquid such as crude oil, hydrocarbon refined fractions from crude oil such as diesel fuel or mineral oil, synthetic hydrocarbons such as n-paraffins, alpha-olefins, internal olefins, and poly-alphaolefins; synthetic liquids such as dialkyl ethers, alkyl alkanoate esters, acetals; and natural oils such as triglycerides including rape-seed oil, sunflower oil and mixtures thereof. Low toxicity and highly biodegradable oils will be generally preferred especially for offshore drilling.

The discontinuous liquid phase is water or a brine and is present from about 0.5% to about 70% by volume of the emulsion.

In order to provide other properties required from wellbore fluids, the wellbore fluids of this invention may further contain any known wellbore fluid additives such as clay, organoclay, or polymeric viscosifiers, filtration reducers such as lignite derivatives or powdered gilsonite filtration reducers, asphalts, asphaltites or polymers swollen, by the oil, weighting agents such as finely divided barytes or hematite, lubricating additives, or any other functional additive known to those skilled in the art. These additives aim to provide a drilling mud that has the following characteristics:

- be fluid and produce affordable pressure drop in surface pipes and drill string
- have a yield stress suitable for supporting/transporting mud solids and drill cuttings
- be chemically, thermally and mechanically stable
- provide hole stability
- provide good lubricity
- prevent excessive fluid loss to the formation The invention will now be illustrated by the following examples.

EXAMPLE 1

This example demonstrates the effectiveness of carbon black in increasing the electrical conductivity of a non-conductive mineral oil (Surdyne B140). The conductivity of the oil is below 1 $\mu$S/m.

We prepared a 1.5% by weight dispersion of carbon black in the mineral oil. The carbon black particles form irregular-shaped aggregates of extremely fine carbon particles fused together.

The size of the aggregates is in the range 10–250 nm but the larger aggregates may be reduced in size by mechanical shearing. The conductivity of the oil-carbon black dispersion was about 20000 $\mu$S/m at 500 Hz and at room temperature.

EXAMPLE 2

In this example we show the effect of carbon black addition on the conductivity of an oil-based mud using a conventional tall oil fatty acid calcium soap as the emulsifier:

Table 1. Formulation for a weighted mud with conventional fatty acid invert emulsifier: oil/water ratio:80/20.

TABLE 1

Formulation for a weighted mud with conventional fatty acid invert emulsifier: oil/water ratio: 80/20.

| Components | Amount in 350 ml of mud |
|---|---|
| Mineral oil (Surdyne B140) | 183.3 g |
| Tall oil fatty acid | 9.0 g |
| Fluid loss additive (TRUFLO 100 ™) | 4.5 g |
| Lime | 5.0 g |
| Carbon black | 6.0 g |
| Sodium chloride | 22.67 g |
| Water | 63.2 g |
| Barite | 131.2 g |

The conductivity of the full mud formulation is reduced to about 15 $\mu$S/m at 500 Hz. The results suggest that a conventional soap of tall oil fatty acid emulsifier (as used in almost all conventional oil-based mud formulations) does not allow the conductive network of carbon black particles to form. This is ascribed to strong adsorption of the calcium neutralised emulsifier on the carbon black particles, inhibiting the particle-particle interactions which form the network.

EXAMPLE 3

Effect of carbon black on the electrical conductivity of an oil-based mud which uses fatty acid diethanolamides (WITCAMIDE 511, a product of WITCO) as the emulsifier:

Table 2. Formulation for a weighted conductive OBM: oil/water ratio: 80/20

TABLE 2

Formulation for a weighted conductive OBM: oil/water ratio: 80/20

| Components | Amount for 350 ml of mud |
|---|---|
| Mineral Oil (Surdyne B 140) | 182.3 g |
| Non-ionic emulsifier | 8.0 g |
| Alpha-olefin sulphonate emulsifier | 1.0 g |
| Fluid loss additive (TRUFLO 100 ™) | 4.5 g |
| Carbon black | 6.0 g |
| NaCl | 21.43 g |
| Water | 59.75 g |
| Barite | 131.1 g |

The conductivity of the above formulation was 10,000 $\mu$S/m at 500 Hz in the full mud formulation. It can be seen that this emulsifier type allows the carbon black conductive network (and hence conductivity) to be maintained, whilst imparting good emulsion stability, even in a weighting fluid where the barite has a diluting effect on the conductive network and reduces the conductivity to some extent. The function of the alpha-olefin sulphonate in the formulation is to improve the oil-wetting of barite.

What is claimed is:

1. An electrically conductive invert emulsion wellbore fluid comprising:
   i) from about 0.2% to about 10% by volume of carbon black particles, and
   ii) one or more emulsifying surfactant(s) selected from the group consisting of: nonionic emulsifiers of Hydrophilic-Lipophilic Balance (HLB) less than about 12, and anionic surfactants wherein the counter-ion is any of alkali metal, ammonium, or hydrogen ions, and wherein the wellbore fluid is substantially free of polyvalent metal cations and wherein the wellbore fluid has conductivity of at least $10^4$ $\mu$S/m.

2. A wellbore fluid according to claim 1 wherein the carbon black exhibits a specific surface area of at least 500 $m^2/g$, and preferably of at least 1500 $m^2/g$.

3. A wellbore fluid according to claims 1 or 2 wherein the nonionic emulsifier is selected from the group consisting of: diethanolamides based on fatty acids of more than 12 carbon atoms, alkoxylated fatty alcohols, alkoxylated alkylphenols, and ethylene oxide propylene oxide block polymers.

4. A wellbore fluid according to claim 1 or 2 wherein the anionic surfactant is selected from the group consisting of: alkane sulphonates, alpha olefin sulphonates, alkyl arene sulphonates, polyolefin sulphonates and acyl taurates, all characterised by the carbon number of the hydrophobic moiety being at least about 12, and by the counter-ion (cation) being any of alkali metal, ammonium, or hydrogen ions.

5. A wellbore fluid according to claim 1 or 2 wherein the anionic surfactant is selected from the group consisting of: fatty acids of 12 or more carbon atoms, phosphate esters of ethoxylated alcohols of 12 or more carbon atoms, phosphate esters of ethoxylated alkyl phenols of 14 or more carbon atoms, and alkyl aminomethylene phosphonates wherein the alkylamine precursor contains 12 or more carbon atoms, all characterised by the counter-ion (cation) being any of alkali metal ion, ammonium, or hydrogen ions.

6. A wellbore fluid according to claims 1 or 2 in which the total dose of emulsifier(s) is in the range 0.5% to 10% by weight.

7. A wellbore fluid according to claims 1 or 2 further comprising a material capable of precipitating or complexing polyvalent metal cations.

8. A wellbore fluid according to claim 7 wherein the emulsified brine phase contains dissolved anions which will form insoluble precipitates with the ions of calcium, magnesium or iron cations.

9. A wellbore fluid according to claim 8 wherein the complexing agent is selected from the group consisting of: the alkali metal or ammonium salts, or the free acids, of citric acid, gluconic acid, glucoheptanoic acid, ascorbic acid, erythorbic acid, nitrolotriacetic acid, ethylene diamine tetraacetic acid, diethylenetriamine pentaacetic acid, hydroxyethylidene diphosphonic acid, nitrolotrismethylenephosphonic acid, aminomethylene phosphonates based on ethylene diamine or diethylene triamine or higher ethyleneamines, and polyphosphates such as tetrasodium pyrophosphate.

10. A method of drilling or completing a well wherein the wellbore fluid used is as in claim 1 or 2.

11. A method of providing enhanced information from electrical logging tools, measurement-while-drilling (MWD), logging while drilling (LWD), geosteering and like wherein the efficiency is enhanced by the improved electrical conductivity of any of the wellbore fluids as in claim 1 or 2.

12. A fluid of claim 8, wherein the dissolved anions include phosphate, carbonate, or silicate.

* * * * *